US011836316B2

(12) United States Patent
Rosenberg

(10) Patent No.: US 11,836,316 B2
(45) Date of Patent: Dec. 5, 2023

(54) STYLUS AND TOUCH INPUT SYSTEM

(71) Applicant: Sensel, Inc., Sunnyvale, CA (US)

(72) Inventor: Ilya Daniel Rosenberg, Sunnyvale, CA (US)

(73) Assignee: Sensel, Inc., Sunnyvale, CA (US)

( * ) Notice: Subject to any disclaimer, the term of this patent is extended or adjusted under 35 U.S.C. 154(b) by 0 days.

(21) Appl. No.: 17/640,619

(22) PCT Filed: Nov. 12, 2021

(86) PCT No.: PCT/US2021/059223
§ 371 (c)(1),
(2) Date: Mar. 4, 2022

(87) PCT Pub. No.: WO2022/104126
PCT Pub. Date: May 19, 2022

(65) Prior Publication Data
US 2023/0289011 A1 Sep. 14, 2023

Related U.S. Application Data

(60) Provisional application No. 63/113,806, filed on Nov. 13, 2020.

(51) Int. Cl.
G06F 3/041 (2006.01)
G06F 3/044 (2006.01)
G06F 3/0354 (2013.01)
(52) U.S. Cl.
CPC .... G06F 3/041662 (2019.05); G06F 3/03545 (2013.01); G06F 3/044 (2013.01); G06F 2203/04106 (2013.01)

(58) Field of Classification Search
CPC .......... G06F 3/041662; G06F 3/03545; G06F 3/044; G06F 2203/04106
See application file for complete search history.

(56) References Cited

U.S. PATENT DOCUMENTS 7,663,607 B2    2/2010 Hotelling et al.
2012/0050207 A1 3/2012 Westhues et al.
(Continued)

OTHER PUBLICATIONS

International Search Report and Written Opinion for International Patent Application No. PCT/US2021/059223 dated Feb. 16, 2022; 9 pages.
(Continued)

Primary Examiner — Peter D McLoone
(74) Attorney, Agent, or Firm — Run8 Patent Group, LLC; Peter Miller; Alexander Rodriguez

(57) ABSTRACT

One variation of a system for tracking stylus inputs on a touch sensor surface includes: a touch sensor surface, and a touch sensor arranged under the touch sensor surface. The touch sensor includes a substrate and a set of drive and sense electrode pairs. The system further includes an excitation inductor arranged under the touch sensor surface and a stylus. The stylus includes: a body; a conductive stylus tip; and a stylus inductor configured to inductively couple to the excitation inductor to induce a voltage at the conductive stylus tip. The system includes a controller configured to: drive the excitation inductor with an alternating voltage signal; detect a set of self-capacitance values across the substrate; and detect a stylus location of a stylus input for the conductive stylus tip on the touch sensor surface based on the set of self-capacitance values and the second set of self-capacitance values.

20 Claims, 7 Drawing Sheets

(56) References Cited

U.S. PATENT DOCUMENTS

2013/0106718 A1    5/2013  Sundara-Rajan
2014/0347311 A1   11/2014  Joharapurkar et al.
2016/0048234 A1*   2/2016  Chandran ............. G06F 3/0442
                                                       345/174

OTHER PUBLICATIONS

Notification of the International Application Number and of the International Filing Date for International Patent Application No. PCT/US2021/059223 dated Dec. 14, 2021; 1 page.

* cited by examiner

STYLUS AND TOUCH INPUT SYSTEM

CROSS-REFERENCE TO RELATED APPLICATIONS

This Application claims the benefit under 35 U.S.C. 371 to International Application No. PCT/US21/59223, filed on 12 Nov. 2021, which claims priority to U.S. Provisional Patent Application No. 63/113,806, filed on 13 Nov. 2020, each of which are incorporated in its entirety by this reference.

This Application is related to U.S. application Ser. No. 17/367,572, on filed 5 Jul. 2021, which is incorporated in its entirety by this reference. Additionally, this Application is related to PCT Application No. PCT/US21/53660, filed on 5 Oct. 2021, which is incorporated in its entirety by this reference.

TECHNICAL FIELD

This invention relates generally to the field of user input devices and more specifically, to a new and useful stylus and touch input system in the field of user input devices.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. System

Figure 1:
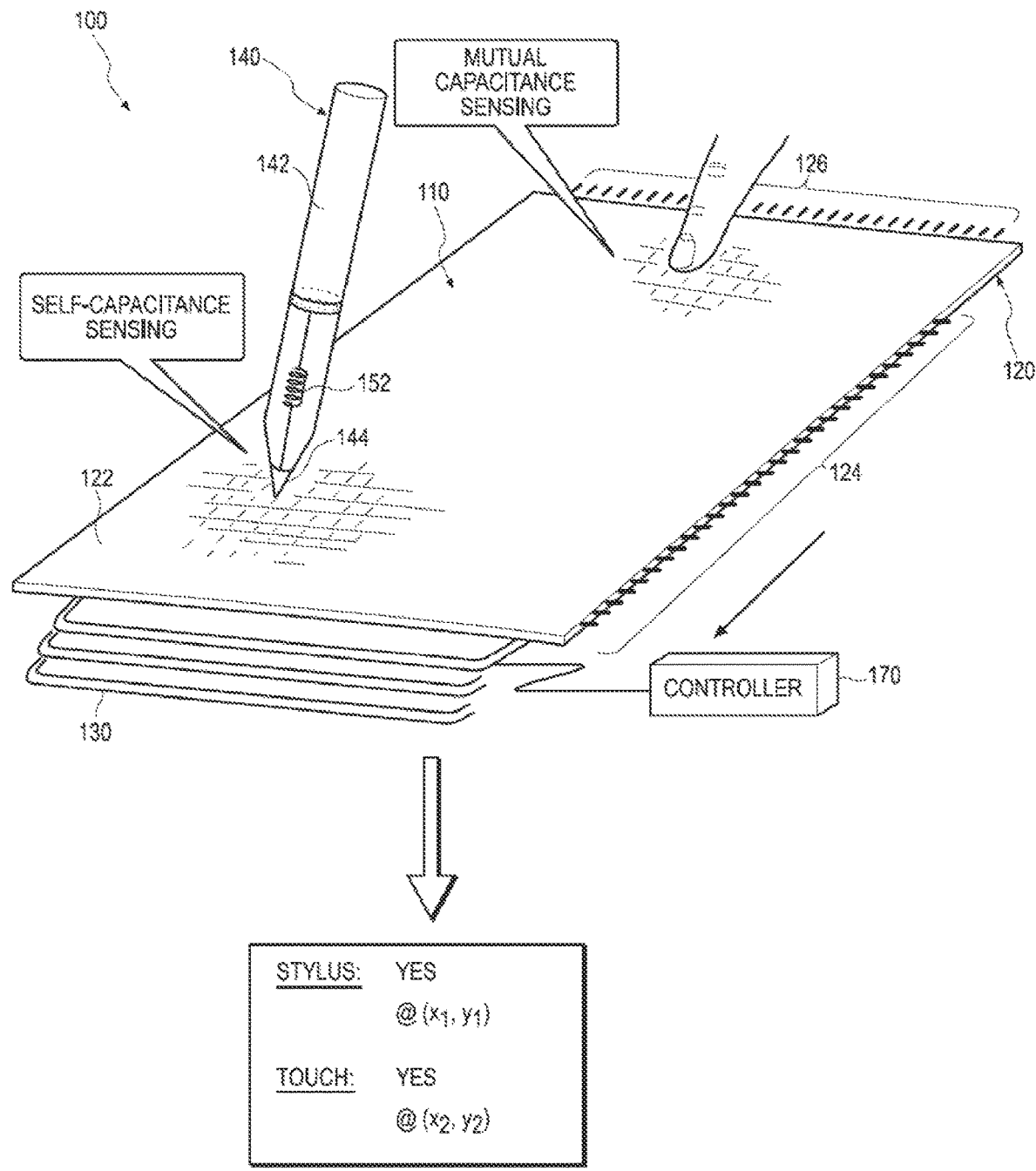
FIG. 1 is a schematic representation of a system for tracking stylus inputs on a touch sensor surface.

As shown in FIG. 1, a system 100 for tracking stylus inputs on a touch sensor surface 110 includes: a touch sensor 120; a stylus 140; and a touch sensor controller 170. The touch sensor 120 includes: a substrate 122; a first array of drive electrodes 124 arranged across the substrate 122; a second array of sense electrodes 126 arranged across the substrate 122; an excitation inductor 130 coupled to the substrate 122; and a touch sensor surface 110 arranged over the substrate 122. The stylus 140 includes: a body 142; a conductive stylus tip 144; and a stylus inductor 152 configured to inductively couple to the excitation inductor 130 and to induce an alternating voltage across the conductive stylus tip 144. The touch sensor controller 170 is configured to, during a touch segment of a scan cycle: drive the first array of drive electrodes 124; detect a set of mutual-capacitance values across the second array of sense electrodes 126; and detect a touch location of an input on the touch sensor surface 110 based on the set of mutual-capacitance values. The touch sensor controller 170 is also configured to, during a stylus segment of the scan cycle: drive the excitation inductor 130 with an alternating signal; detect a first set of self-capacitance values across the first array of drive electrodes 124; detect a second set of self-capacitance values across the second array of sense electrodes 126; an detect a stylus location of the conductive stylus tip 144 on the touch sensor surface 110 based on the first set of self-capacitance values and the second set of self-capacitance values.

In one variation, the system 100 includes a touch sensor surface 110, and a touch sensor 120 arranged under the touch sensor surface 110. The touch sensor 120 can include: a substrate 122; a first array of drive electrodes 124 and a second array of sense electrodes 126 defining a set of drive and sense electrode pairs arranged on the substrate 122. The system 100 further includes an excitation inductor 130 arranged under the touch sensor surface 110. Additionally, the system 100 includes a stylus 140 including: a body 142; a conductive stylus tip 144 arranged on a distal end of the body 142; and a stylus inductor 152 arranged in the body 142. The stylus inductor 152 is configured to inductively couple to the excitation inductor 130 to induce a voltage at the conductive stylus tip 144. The system 100 further includes a touch sensor controller 170 coupled to the touch sensor 120 and configured to, during a stylus segment of the scan cycle: drive the excitation inductor 130 with an alternating voltage signal; detect a set of self-capacitance values across the set of drive and sense electrode pairs; and detect a stylus location of a stylus input for the conductive stylus tip 144 on the touch sensor surface 110 based on the set of self-capacitance values.

In another variation, the system 100 includes a touch sensor surface 110, and a touch sensor 120 arranged under the touch sensor surface 110. The touch sensor 120 can include: a substrate 122; a first array of drive electrodes 124 arranged on the substrate 122; and a second array of sense electrodes 126 arranged on the substrate 122 and paired with the first array of drive electrodes 124. Additionally, the system 100 includes an excitation inductor 130 arranged under the touch sensor surface 110. Furthermore, the system 100 includes a stylus 140 including: a body 142; a conductive stylus tip 144 arranged on a distal end of the body 142; and a stylus inductor 152 arranged in the body 142. The stylus inductor 152 is configured to inductively couple to the excitation inductor 130 to induce a voltage at the conductive stylus tip 144. The system 100 further includes a touch sensor controller 170 coupled to the touch sensor 120 and configured to, during a touch segment of a scan cycle: drive the first array of drive electrodes 124; detect a set of mutual-capacitance values across the second array of sense electrodes 126; and detect a touch location of a non-stylus input on the touch sensor surface 110 based on the set of mutual-capacitance values. The touch sensor controller 170 is further configured to, during a stylus segment of the scan cycle: drive the excitation inductor 130 with an alternating voltage signal; detect a first set of self-capacitance values across the first array of drive electrodes 124; detect a second set of self-capacitance values across the second array of sense electrodes 126; and detect a stylus location of a stylus input for the conductive stylus tip 144 on the touch sensor surface 110 based on the first set of self-capacitance values and the second set of self-capacitance values.

In yet another variation, the system 100 includes a touch sensor surface 110, and a touch sensor 120 arranged under the touch sensor surface 110. The touch sensor 120 can include: a substrate 122; a first array of drive electrodes 124 arranged on the substrate 122; and a second array of sense electrodes 126 arranged on the substrate 122 and paired with the first array of drive electrodes 124. Additionally, the system 100 includes an excitation inductor 130 arranged under the touch sensor surface 110. Furthermore, the system 100 includes a stylus 140 including: a body 142; a conductive stylus tip 144 arranged on a distal end of the body 142; and a stylus circuit 150 characterized by a resonant frequency. The stylus circuit 150 includes a stylus inductor 152 configured to inductively couple to the excitation inductor 130 to induce a voltage at the conductive stylus tip 144 at a phase offset, and a capacitor 154 arranged in parallel with the stylus inductor 152. The system 100 further includes a touch sensor controller 170 coupled to the touch sensor 120 and configured to, during a stylus segment of the scan cycle: at a first time, drive the excitation inductor 130 at a drive frequency matching the resonant frequency for the stylus circuit 150; and, at a second time temporally offset from the first time matching the phase offset, detect a first set of self-capacitance values across the first array of drive electrodes 124, and detect a second set of self-capacitance values across the second array of sense electrodes 126. The touch sensor controller 170 can then detect a stylus location of a stylus input for the conductive stylus tip 144 on the touch sensor surface 110 based on the first set of self-capacitance values and the second set of self-capacitance values.

2. Applications

Generally, the system 100 includes a touch sensor 120, a touch sensor controller 170, and a passive stylus 140 that cooperate to detect and track both touch (e.g., finger, palm) inputs and stylus inputs on a touch sensor surface 110. In particular, the system 100 can: power the stylus 140 with an excitation inductor 130 via inductive charging; implement mutual-capacitance touch sensing techniques to drive the first array of drive electrodes 124, capture mutual-capacitance values from the second array of sense electrodes 126, and detect touch inputs on the touch sensor surface 110 based on these mutual-capacitance values; and then implement self-capacitance touch sensing techniques to capture self-capacitance values from both sense and drive electrodes and detect stylus inputs on the touch sensor surface 110 based on these self-capacitance values, all within a single scan cycle, such as over a period of 20 milliseconds. The system 100 can repeat this process over subsequent scan cycles to track touch and stylus inputs across the touch sensor surface 110.

Therefore, the system 100 can include a low density of excitation inductors 130—such as one excitation inductor 130 per 1,000, 10,000, or 100,000 drive and sense electrode pairs—that inductively couple(s) to the stylus inductor 152 to drive the conductive stylus tip 144 of the stylus 140 to a voltage potential. The system 100 can also include a high-density array of drive and sense electrodes that cooperate to form a touch sensor 120: operable in a mutual-capacitance configuration to detect fingers on and near the touch sensor surface 110; and operable in a self-capacitance configuration to detect the conductive stylus tip 144 of the stylus 140 when driven to a voltage potential by the stylus inductor 152 via inductive coupling to the excitation inductors 130.

Because the stylus 140 is energized by the excitation inductors 130 via inductive coupling, the stylus 140 may not require charging or other complex circuitry, and the stylus 140 is inherently synchronized to excitation of the excitation inductors 130 (controlled and timed by the touch sensor controller 170), such as with a known phase offset based on inductance of the stylus inductor 152 and a resistor and/or a capacitor 154 arranged in the stylus 140 between the stylus inductor 152 and the conductive stylus tip 144. Because the conductive stylus tip 144 of the stylus 140 capacitively couples to drive and sense electrodes in the touch sensor 120, the system 100 can track locations of both the stylus 140 and other inputs (e.g., fingers, palms) on the touch sensor surface 110—at the same rate and resolution—via the same drive and sense electrodes. Furthermore, because the stylus 140 drives the conductive stylus tip 144 to a voltage potential (e.g., 10 Volts, 50 Volts) when the excitation inductors 130 are active, the stylus 140 can capacitively couple to and induce a detectable change in capacitance between the drive and sense electrodes over a relatively large distance (e.g., up to ten centimeters) between the conductive stylus tip 144 and the touch sensor surface 110, thereby enabling the touch sensor controller 170 to detect and track the conductive stylus tip 144 approaching, hovering over, in contact with, and then retracting from the touch sensor surface 110.

The system 100 can be integrated into a computing device—such as below a display or integral with a touchscreen of a smartphone or tablet or in a touchpad of a laptop computer—to enable detection of and response to finger, palm, and stylus inputs on the computing device, such as concurrently. The system 100 can additionally or alternatively be integrated into a peripheral device, such as a peripheral touch pad or sketch pad.

3. Touch Sensor

In one implementation, the touch sensor 120 includes a multi-layer PCB, including: a first subset of layers defining an array of sense and drive electrodes, such as a set of columns of drive electrodes and a set of rows of sense electrodes that form an array of drive and sense electrode pairs; and a second subset of layers—below the first subset of layers—defining coil traces fabricated directly on these layers and connected by vias to form an excitation inductor 130, such as one large excitation inductor 130 spanning the full width and length of the touch sensor 120, four excitation inductors 130 spanning individual quadrants of the touch sensor 120, etc.

In another implementation, the PCB includes: a first subset of layers defining the array of sense and drive electrodes; and a bottom layer—below the first subset of layers—defining an array of coil pads. In this implementation, a set of discrete inductors are bonded to the array of coil pads to form an array of excitation inductors 130.

In yet another implementation, the touch sensor 120 includes: a PCB including the array of sense electrodes; and a second substrate 122, chassis, or other structural element—located behind or extending around the perimeter of the PCB—containing or integrated with the excitation inductor 130.

In another implementation, the touch sensor 120 includes a first excitation inductor 130 arranged under a first region of the touch sensor surface 110, and a second excitation inductor 132 arranged under a second region of the touch sensor surface 110. The touch sensor controller 170 can then detect clusters of capacitance values in the respective regions to interpret stylus and non-stylus inputs.

For example, the system 100 can include a first excitation inductor 130 including a first coiled wire coupled to (e.g., integrated into or arranged under) the substrate 122 under a first region of the touch sensor surface 110. Additionally, the system 100 includes a second excitation inductor 132 including a second coiled wire coupled to the substrate 122 under a second region of the touch sensor surface 110. The touch sensor controller 170 can then: detect a first cluster of capacitance values in the first set of self-capacitance values and the second set of self-capacitance values; and, in response to the first cluster of capacitance values matching a target stylus capacitance characteristic, the touch sensor controller 170 can detect the first stylus location of the stylus 140 on the first region of the touch sensor surface 110.

In another example, the system 100 can include a first excitation inductor 130 including a first coiled wire coupled to the substrate 122 under a first region of the touch sensor surface 110. Additionally, the system 100 includes a second excitation inductor 132 including a second coiled wire coupled to the substrate 122 under a second region of the touch sensor surface 110. The touch sensor controller 170 can then, during a second touch segment of the scan cycle: drive the second excitation inductor 132 with the alternating voltage signal; detect a third set of self-capacitance values from the first array of drive electrodes 124; and detect a fourth set of self-capacitance values from the second array of sense electrodes 126. Furthermore, the touch sensor controller 170 can then detect a second cluster of capacitance values in the third set of self-capacitance values and the fourth set of self-capacitance values and, in response to the second cluster of capacitance values matching a target non-stylus capacitance characteristic, detect the touch location of the non-stylus input on the second region of the touch sensor surface 110.

4. Touch Sensor Controller

The touch sensor controller 170 is connected to the touch sensor 120 and executes methods and techniques described below to track locations and other characteristics of the stylus 140 near the touch sensor surface 110. In particular, the touch sensor controller 170 can: selectively apply voltages across each column of drive electrodes, read capacitance values from the rows of sense electrodes, and detect (x,y) locations of touches on the touch sensor surface 110 based on these capacitance values in a mutual-capacitance touch-sensing configuration; and read capacitance values from the columns of drive electrodes, read capacitance values from the rows of sense electrodes, and detect (x,y) locations of the conductive stylus tip 144 on or near the touch sensor surface 110 based on these capacitance values in a self-capacitive stylus-sensing configuration. In the self-capacitive stylus-sensing configuration, the touch sensor controller 170 can also selectively actuate the excitation inductors 130 by supplying an alternating voltage to the excitation inductors 130 at a "drive frequency" (e.g., 200 Hz), which induces an alternating magnetic field at the excitation inductors 130 and produces inductive coupling between the excitation inductors 130 and the stylus inductor 152 if the stylus 140 is near the touch sensor surface 110.

5. Stylus

The stylus 140 includes: a body 142; a conductive stylus tip 144 arranged on a distal end of the body 142; and a stylus inductor 152 arranged in the body 142 behind and electrically coupled to the conductive stylus tip 144 to form a stylus circuit 150. The stylus 140 can also include a conductive ring 186 arranged on the body 142, coupled to the stylus circuit 150, forming a ground plane, and configured to electrically couple a user's hand to this ground plane when the stylus 140 is in use.

The stylus 140 can also include a capacitor 154 arranged in parallel with the stylus inductor 152 and coupled to the conductive stylus tip 144 in the stylus circuit 150 to form a resonant LC circuit. For example, this LC circuit can be characterized by a resonant frequency near (e.g., matched to) the drive frequency such that the voltage at the conductive stylus tip 144 oscillates in synchronicity (with a known, consistent phase offset) with excitation inductors 130 when driven at the drive frequency.

Generally, the stylus 140 is inductively powered by the array of excitation inductors 130 in the touch sensor 120 and capacitively couples to nearby electrodes in the touch sensor 120, thereby effecting changes in capacitance values of these nearby electrodes that are detectable by the touch sensor controller 170 and interpretable as specific (x,y) locations of the stylus 140 during a scan cycle. In particular, the stylus 140 is configured: to inductively couple to and to harvest energy from the excitation inductor 130 in (or connected to, adjacent) the touch sensor 120; and to capacitively couple to the array of sense electrodes in the touch sensor 120, thereby effecting capacitance values across nearby sense electrodes, which the touch sensor 120 interprets as presence and location of the conductive stylus tip 144. Therefore, when the stylus 140 is brought near the touch sensor 120 when the excitation inductors 130 are energized with an alternating current, the stylus inductor 152 couples to the (nearest) excitation inductor 130(s), which causes an alternating current to flow through the stylus inductor 152 and thus produces an alternating voltage across the conductive stylus tip 144. This alternating voltage at the conductive stylus tip 144 can disrupt self-capacitance values at nearby drive and sense electrodes in the touch sensor 120, such as by bleeding electrical charge onto these sense electrodes and then drawing electrical change from these electrodes as the stylus circuit 150 alternates the voltages across the conductive stylus tip 144, thereby changing capacitance values (e.g., charge time, discharge time, max voltage, charge rate, discharge rate) of these nearby electrodes.

5.1 Smart Stylus

Figure 2:
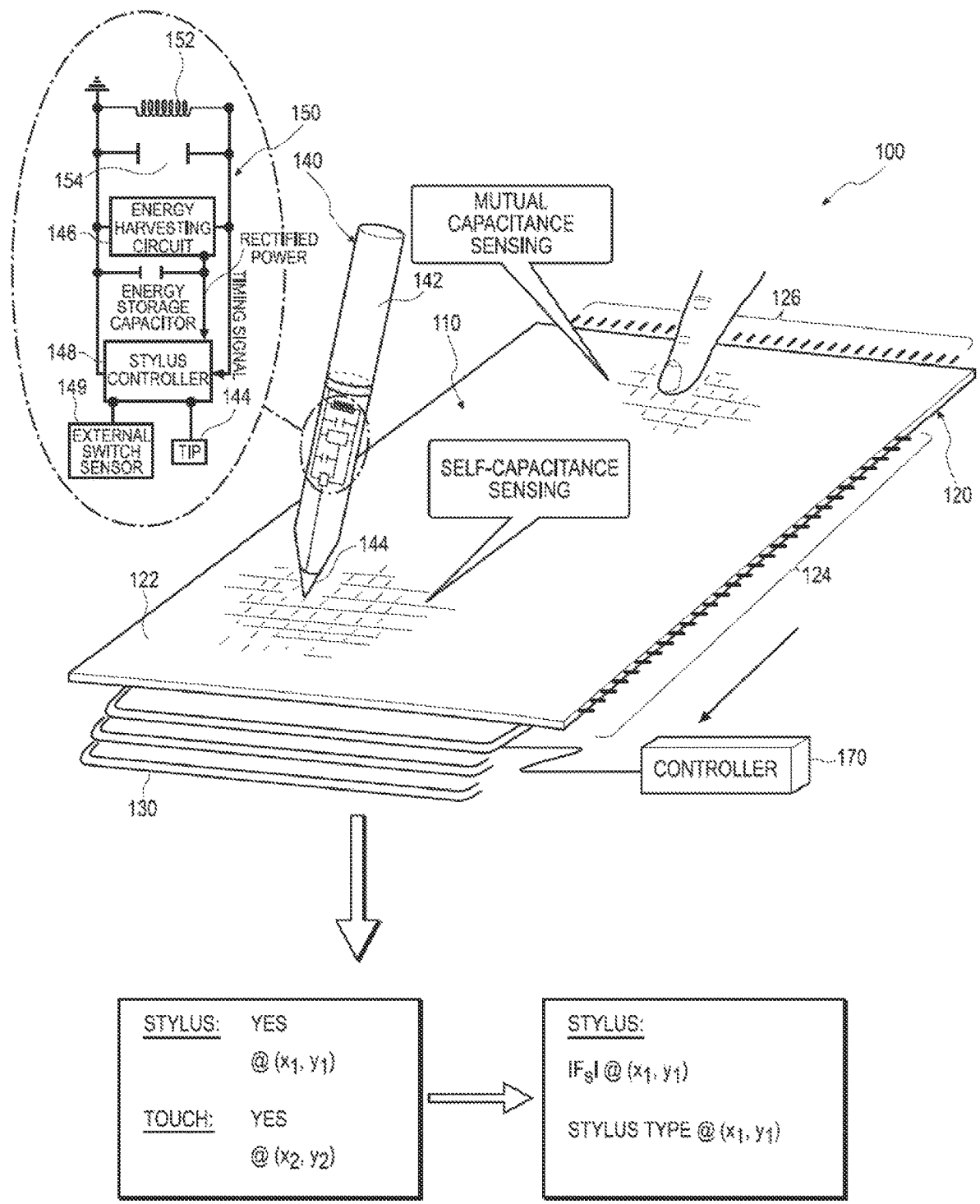
FIG. 2 is a schematic representation of one variation of the system for tracking stylus inputs.
Figure 3A:
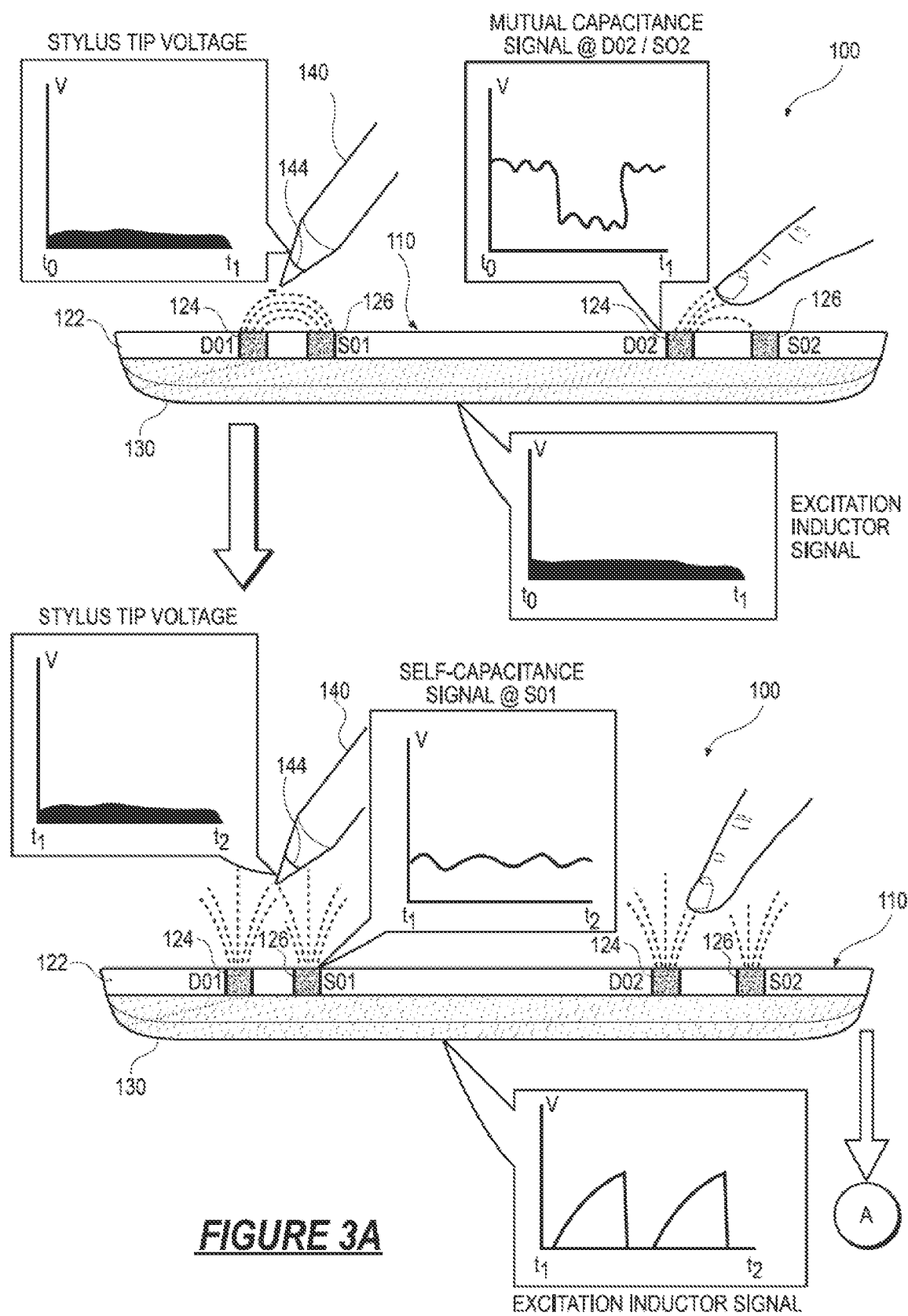
FIGS. 3A and 3B is a schematic representation of one variation of the system for tracking stylus inputs.
Figure 3B:
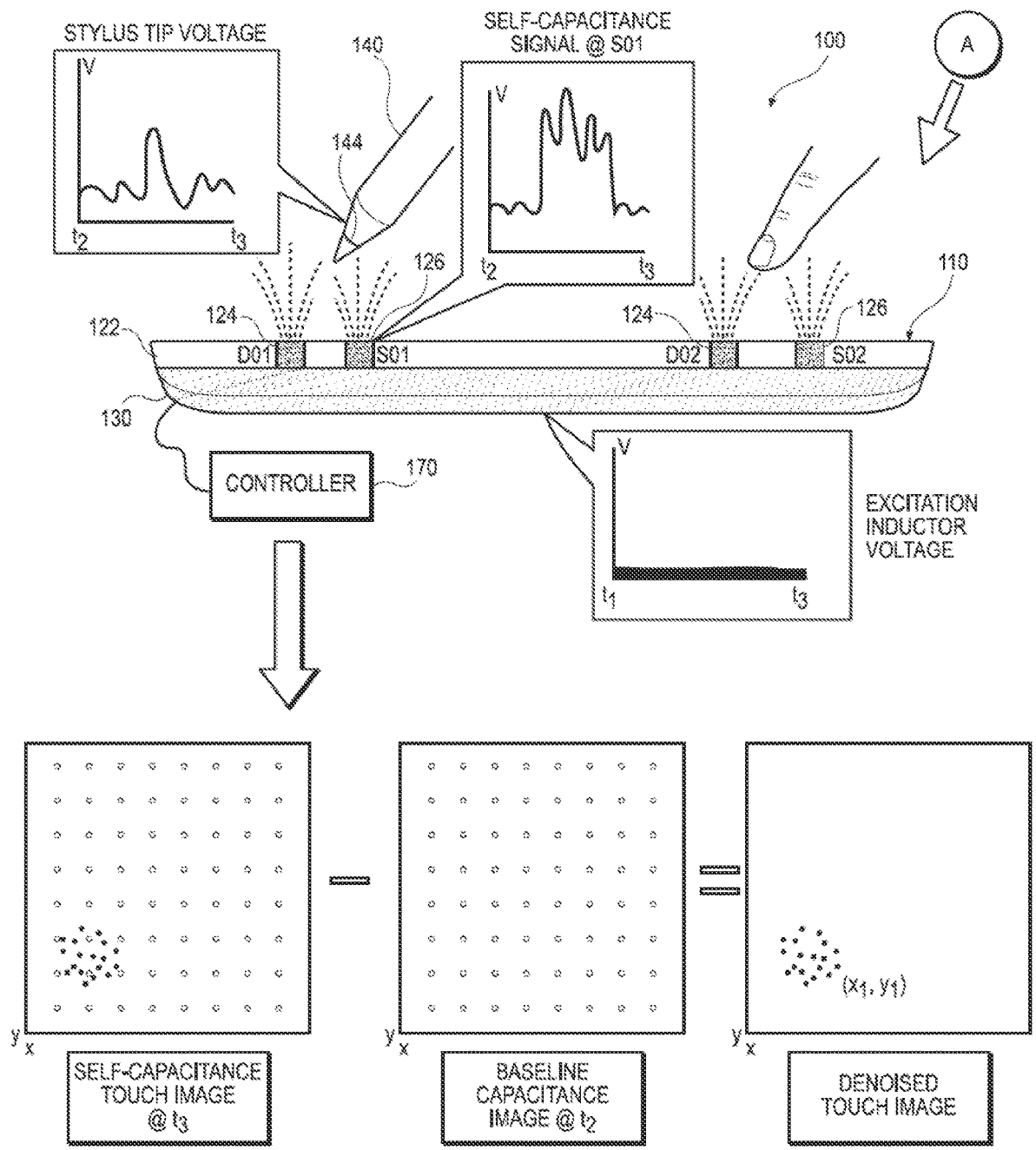
Figure 4:
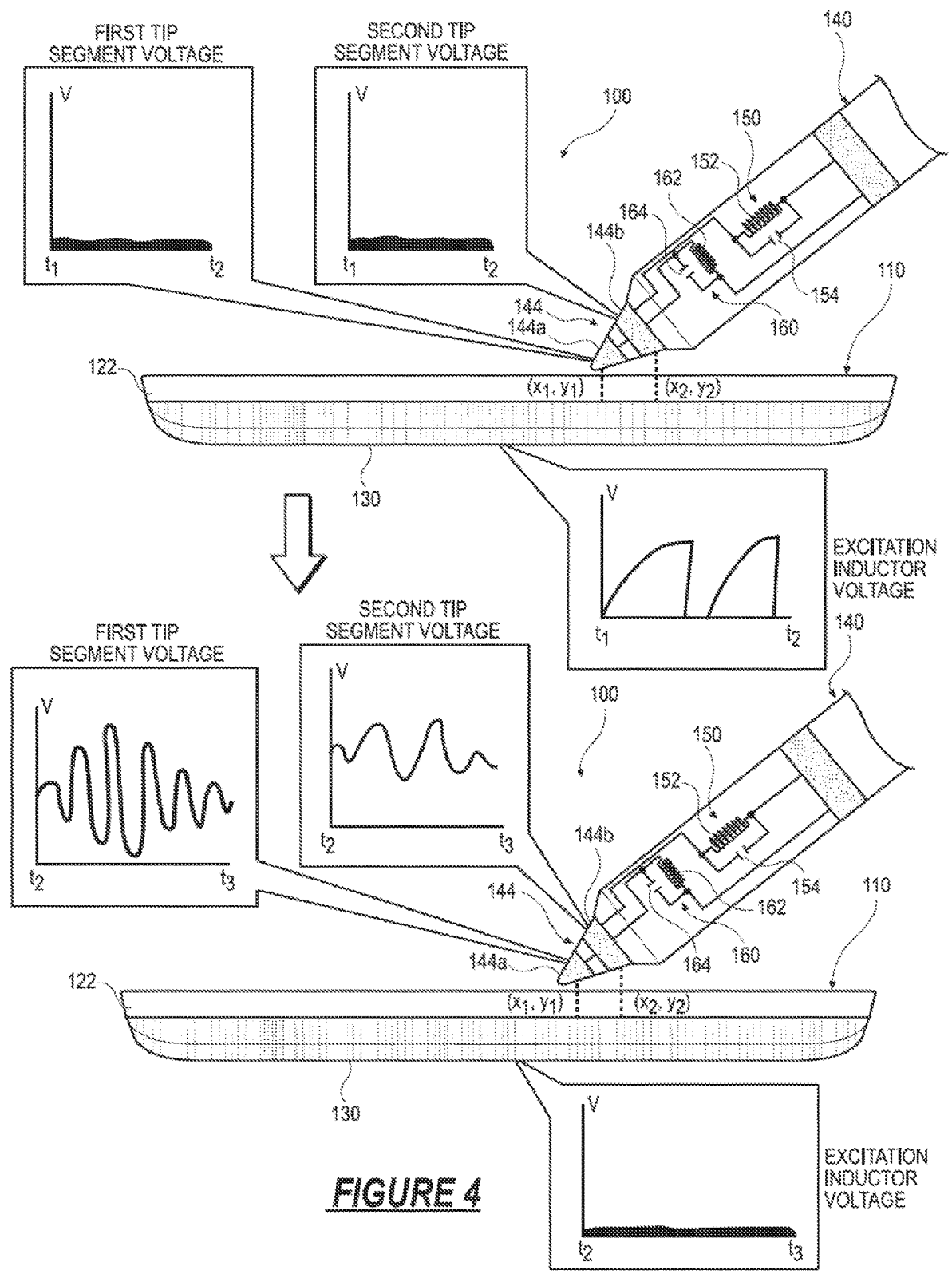
FIG. 4 is a schematic representation of one variation of the system for tracking stylus inputs.
Figure 5:
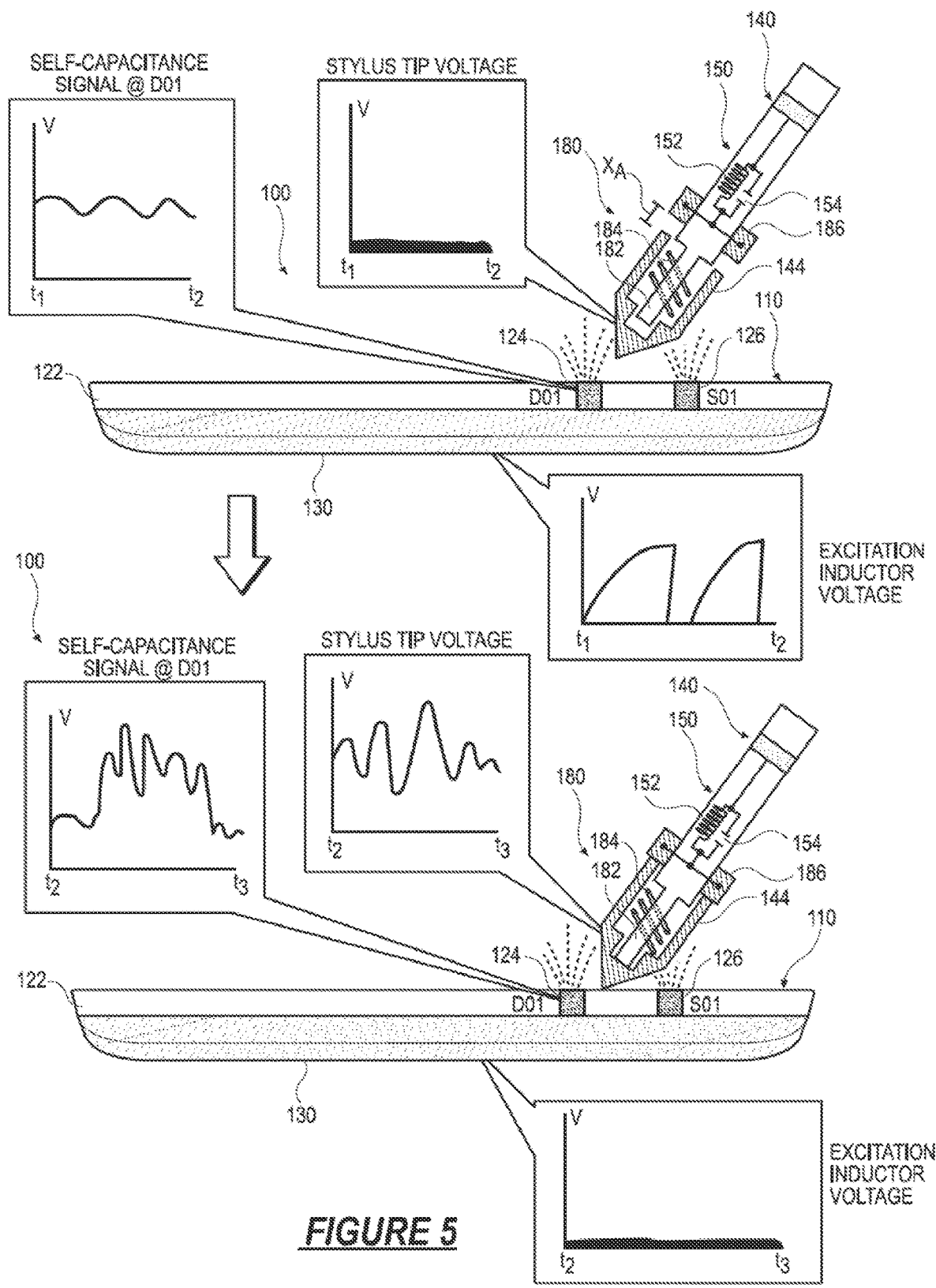
FIG. 5 is a schematic representation of one variation of the system for tracking stylus inputs.
Figure 6:
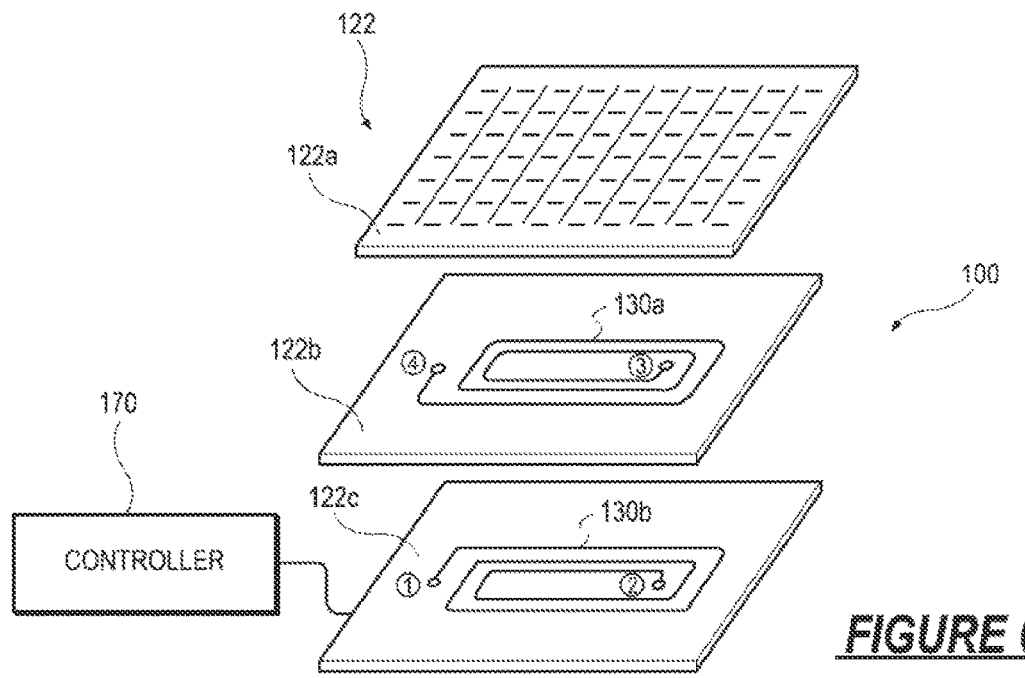
FIG. 6 is a schematic representation of one variation of the system for tracking stylus inputs.
Figure 7:
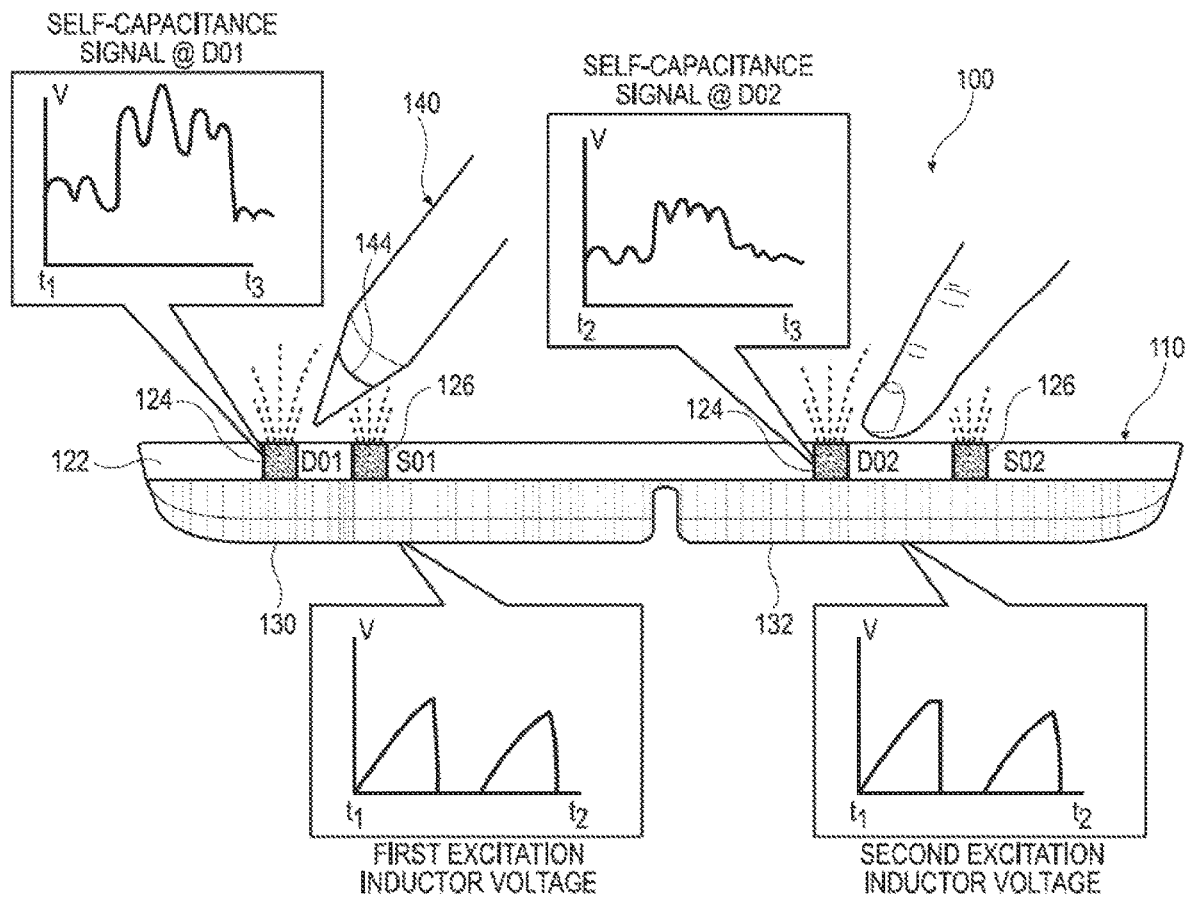
FIG. 7 is a schematic representation of one variation of the system for tracking stylus inputs.

In one variation, the stylus 140 also includes: an energy harvesting circuit 146 coupled to the stylus inductor 152; and a stylus controller 148. In this variation, the stylus controller 148: can be powered via energy captured by the energy harvesting circuit 146 when the stylus inductor 152 couples to an oscillating magnetic field produced by the excitation inductor 130 in the touch sensor 120; and can be coupled to the conductive stylus tip 144 and configured to selectively apply a controlled voltage to the conductive stylus tip 144—such as in the form of an encoded digital signal—that produces detectable changes in capacitance at sense and drive electors in the touch sensor 120. Additionally, as depicted in FIG. 2, the stylus 140 can further include: a capacitor 154 arranged in parallel to the stylus inductor 152 to define a resonant frequency; an energy storing capacitor coupled to the stylus controller 148 configured to store energy delivered to the stylus controller 148. Furthermore, the stylus 140 can include a timing signal transmitted from the stylus inductor 152 to the stylus controller 148 configured to allow the controller to: synchronize transmission with the inductive signal; and measure a signal strength of the inductive signal.

In one implementation, the stylus controller 148 drives the conductive stylus tip 144 to an alternating voltage at a "tip frequency"—different from the drive frequency of the touch sensor 120—based on a function or identity of the stylus 140. For example, for a 200 Hz drive frequency implemented at the excitation inductors 130, the stylus controller 148 can implement: 100 Hz tip frequency for a stylus 140 of a first type or for a first function selection (e.g., thin black line) at the stylus 140; a 200 Hz tip frequency for a stylus 140 of a second type or for a second function selection (e.g., thick black line) at the stylus 140; a 300 Hz tip frequency for a stylus 140 of a third type or for a third function selection (e.g., eraser) at the stylus 140; and/or a 400 Hz tip frequency for a stylus 140 of a fourth type or for a fourth function selection (e.g., highlighter) at the stylus 140.

For example, the stylus 140 can include: an energy harvesting circuit 146 coupled to the stylus circuit 150 and configured to store energy produced when the stylus inductor 152 couples to the excitation inductor 130; and a stylus controller 148 coupled to the energy harvesting circuit 146 and configured to drive the conductive stylus tip 144 at a tip frequency to induce a second voltage different from the first voltage. The touch sensor controller 170 can then: access a tip function based on the tip frequency from a set of tip functions. The touch sensor controller 170 can then, during a second stylus segment proceeding the stylus segment in the scan cycle: detect a third set of self-capacitance values across the first array of drive electrodes 124; and detect a fourth set of self-capacitance values across the second array of sense electrodes 126. The touch sensor controller 170 can then detect a cluster of oscillating capacitance values, at the tip frequency, in the third set of self-capacitance values and the third set of self-capacitance values, and assign the tip function to the stylus input.

In another implementation, the stylus controller 148 "encodes" a unique identifier of the stylus 140 into an oscillating voltage applied to the conductive stylus tip 144. The touch sensor controller 170 can then decode this unique identifier from oscillating capacitance values detected by a cluster of electrodes in the touch sensor 120 adjacent the conductive stylus tip 144 and enable or implement functions based on the unique identifier of the stylus 140.

In yet another implementation, the stylus 140 further includes a force sensor 149 coupled to the conductive stylus tip 144. In this implementation, the stylus controller 148: reads an output of the force sensor 149; interprets a force magnitude applied by the conductive stylus tip 144 to an adjacent surface (e.g., the touch sensor surface no) based on the output of the force sensor 149; and encodes this force magnitude—as a digital value—into the oscillating voltage of the conductive stylus tip 144. The touch sensor controller 170 can then decode this force value from oscillating capacitance values detected by a cluster of electrodes in the touch sensor 120 adjacent the conductive stylus tip 144 and label a stylus input location detected during this scan cycle—based on the location of this cluster of electrodes—with this force magnitude.

For example, the stylus 140 can include: an energy harvesting circuit 146 coupled to the stylus circuit 150 and configured to store energy produced when the stylus inductor 152 couples to the excitation inductor 130; a force sensor 149 coupled to the conductive stylus tip 144; and a stylus controller 148 coupled to the energy harvesting circuit 146 and the force sensor 149. The stylus controller 148 can then: detect a force magnitude applied to the touch sensor surface 110 from the force sensor 149; transform the force magnitude into a tip frequency, such as based on a stored parametric force-to-frequency model matched to a frequency-to-force model stored on and implemented by the touch sensor controller 170; and drive the conductive stylus tip 144 at the tip frequency to induce a second voltage—different from the first voltage—representative of the force magnitude on the conductive stylus tip 144. The touch sensor controller 170 can be configured to, during a second touch segment of a second scan cycle: detect a third set of self-capacitance values from the first array of drive electrodes 124; and detect a fourth set of self-capacitance values from the second array of sense electrodes 126. Furthermore, the touch sensor controller 170 can: detect a cluster of oscillating capacitance values, at the tip frequency, in the third set of self-capacitance values and the fourth set of self-capacitance values; and then interpret the first force magnitude for the stylus input based on a frequency of the cluster of oscillating capacitance values and the frequency-to-force model.

Alternatively, in a similar implementation, the stylus controller 148 can vary the frequency of the oscillation voltage applied across the stylus 140 as a function of (e.g., proportional to) this force magnitude detected by the force sensor 149. The touch sensor controller 170 can then decode this force value from the frequency of oscillating capacitance values detected by a cluster of electrodes in the touch sensor 120 during a scan cycle.

5.2 Passive Stylus Functions

In another variation, the stylus 140 includes a force sensor 149 coupled to and forming a variable resistor in the stylus circuit 150. The force sensor 149, the stylus inductor 152, and the capacitor 154 in the stylus 140 can thus form an LRC circuit exhibiting a resonant frequency that changes as a function of force applied to the conductive stylus tip 144. The touch sensor controller 170 can then decode a current force applied to the conductive stylus tip 144 from the frequency of oscillating capacitance values detected by a cluster of electrodes in the touch sensor 120 during a scan cycle.

In a similar variation, the stylus 140 includes a set of capacitors selectively coupled to the stylus circuit 150 via a multi-position switch. Thus, in this variation, the LC circuit in the stylus 140 can exhibit a resonant frequency as a function of the position of the switch, which selectively (de)couples these capacitors to the stylus circuit 150. For example, the stylus switch can be labeled with a range of switch positions corresponding to stylus functions, including: thin black line; thick black line; eraser; and highlighter. The touch sensor controller 170 can then decode a current selection at the switch from the frequency of oscillating capacitance values detected by a cluster of electrodes in the touch sensor 120 during a scan cycle and then implement a function or option based on this decoded switch position.

For example, the stylus 140 can include a first stylus circuit 150 characterized by a variable resonant frequency. The first stylus circuit 150 includes the first stylus inductor 152, and a first set of capacitors each selectively coupled to the first stylus inductor 152. The touch sensor controller 170 is configured to, during the stylus segment of the scan cycle: at a first time, drive the first excitation inductor 130 at a first drive frequency matching a first resonant frequency in the first stylus circuit 150 for a first capacitor 154 from the first set of capacitors. Furthermore, the touch sensor controller 170 is configured to, at a second time, temporally offset from the first time: detect the first set of self-capacitance values from the first array of drive electrodes 124; and detect the second set of self-capacitance values from the second array of sense electrodes 126. Additionally, the touch sensor controller 170 is configured to: access a first stylus type based on the first resonant frequency; detect a cluster of oscillating capacitance values, at the first resonant frequency, in the first set of self-capacitance values and the second set of self-capacitance values; and assign the first stylus type to the stylus input.

Further in this example, the touch sensor controller 170 is configured to, during a second stylus segment of a second scan cycle, at a third time, drive the first excitation inductor 130 at a second drive frequency matching a second resonant frequency in the first stylus circuit 150 for a second capacitor 164 from the first set of capacitors. Furthermore, the touch sensor controller 170 is configured to, at a fourth time, temporally offset from the third time: detect a third set of self-capacitance values from the first array of drive electrodes 124; and detect a fourth set of self-capacitance values from the second array of drive electrodes. Additionally, the touch sensor controller 170 is configured to: access a second stylus type, different from the first stylus type, based on the second resonant frequency; detect a second cluster of oscillating capacitance values, at the second resonant frequency, in the third set of self-capacitance values and the fourth set of self-capacitance values; and detect a second stylus input based on the second cluster of oscillating capacitance values. The touch sensor controller 170 can then assign the second stylus type to the second stylus input.

6. Input Detection and Characterization

Generally, the touch sensor controller 170 can: drive the first array of drive electrodes 124, detect a set of mutual-capacitance values across the second array of sense electrodes 126, and detect a touch location of an input on the touch sensor surface 110 based on the set of mutual-capacitance values during a touch segment of a scan cycle; and drive the excitation inductor 130 with an alternating signal, detect a first set of self-capacitance values across the first array of drive electrodes 124, detect a second set of self-capacitance values across the second array of sense electrodes 126, and detect a stylus location of the conductive stylus tip 144 on the touch sensor surface 110 based on the first set of self-capacitance values and the second set of self-capacitance values during a stylus segment of the scan cycle.

6.1 Mutual vs. Self-Capacitance Stylus Sensing

Generally, the system 100 can: drive the first array of drive electrodes 124, detect a set of mutual capacitance values across the second array of sense electrodes 126, and detect a touch location of a non-stylus input on the touch sensor surface 110 based on the mutual capacitance values; and drive the excitation inductor 130 with an alternating voltage signal; detect a first set of self-capacitance values across the first array of drive electrodes 124, detect a second set of self-capacitance values across the second array of sense electrodes 126; and detect a stylus location of a stylus input on the touch sensor surface 110 based on the first set of self-capacitance values and the second set of self-capacitance values.

Additionally, or alternatively, the system 100 can: drive the first array of drive electrodes 124, detect a set of mutual capacitance values across the second array of sense electrodes 126, and detect a touch location of a non-stylus input on the touch sensor surface 110 based on the set of mutual capacitance values; and drive the excitation inductor 130 with an alternating voltage signal, detect a first set of self-capacitance values across the second array of sense electrodes 126, and detect a stylus location of a stylus input on the touch sensor surface 110 based on the first set of self-capacitance values. By not detecting a second set of self-capacitance values across the first array of drive electrodes 124, half of the spatial resolution for detecting stylus inputs in utilized. However, the touch sensor controller 170 conserves energy while detecting stylus inputs. In one example, a stylus tip geometry is consistent and less than a geometry for a finger, which can be utilized to detect stylus inputs at half of the spatial resolution.

6.2 Input Detection: Phase Offset

In one implementation, the system 100 can detect self-capacitance values from the first array of drive electrodes 124 and the second array of sense electrodes 126 based on a phase offset between a voltage induced across the conductive stylus tip 144 and an alternating voltage signal driven to the excitation inductor 130. The phase offset represents peak capacitance coupling between the stylus 140 and the set of drive and sense electrode pairs. As such, the touch sensor controller 170 can be implemented to detect self-capacitance values during peak capacitance coupling.

For example, the system 100 can include the stylus inductor 152 arranged in the body 142 and configured to inductively couple to the excitation inductor 130 in order to induce a voltage at the conductive stylus tip 144 that is synchronized with the alternating voltage signal—output via the excitation inductor 130—at a phase offset. During the stylus segment of the scan cycle, the touch sensor controller 170 is then configured to: at a first time, drive the excitation inductor 130 with the alternating voltage signal to inductively couple the stylus inductor 152; and, at a second time temporally offset from the first time matching the phase offset, detect the first set of self-capacitance values across the first array of drive electrodes 124; and detect the second set of self-capacitance values across the second array of sense electrodes 126. The touch sensor controller 170 can further be configured to: detect a peak capacitance value in the first set of self-capacitance values and the second set of self-capacitance values; and detect the stylus location of the stylus input over the touch sensor surface 110 based on the peak capacitance value.

In this implementation, by detecting the self-capacitance values at the second time matching the phase offset, peak capacitive coupling is detected in the first set of self-capacitance values and the second set of self-capacitance values. Additionally, the phase offset for the voltage induced across the conductive stylus tip 144 can be adjusted by arranging a resistor and/or a capacitor 154 in series with the stylus inductor 152.

6.3 Input Detection: Resonant Frequency

In one implementation, the system 100 can detect self-capacitance values from the first array of drive electrodes 124 and the second array of sense electrodes 126 based on a resonant frequency characterized for the stylus circuit 150. In this implementation, the stylus 140 includes a stylus circuit 150 including the stylus inductor 152 and a capacitor 154 arranged in parallel to each other in order to define the resonant frequency.

For example, the system 100 can include the stylus 140 including a stylus circuit 150 characterized by a resonant frequency. The stylus circuit 150 includes the stylus inductor 152, and a capacitor 154 arranged in parallel with the stylus inductor 152 and coupled to the conductive stylus tip 144. The touch sensor controller 170 can be configured to: detect a cluster of oscillating capacitance values in the first set of self-capacitance values and the second set of self-capacitance values; and detect the stylus location of the stylus input over the touch sensor surface 110 based on the cluster of oscillating capacitance values. More specifically, during the stylus segment of the scan cycle, the touch sensor controller 170 can drive the excitation inductor 130 at a drive frequency matched to the resonant frequency to generate a magnetic pulse that inductively couples to the stylus inductor 152. The touch sensor controller 170 can then detect the cluster of oscillating capacitance values, in the first set of self-capacitance values and the second set of capacitance values, oscillating at the resonant frequency.

6.4 Touch, Stylus, and Baseline Scan Cycle Segments

In one implementation, during the touch segment of a scan cycle, the touch sensor controller 170 implements mutual capacitive touch sensing techniques to: drive a first drive electrode column; read a first capacitance value from a first sense electrode row; drive the first drive electrode column; read a second capacitance value from a second sense electrode row; repeat this process for each other sense electrode row to generate a first set of capacitance values for each row of sense electrodes when capacitively coupled to the first drive electrode column; and further repeat this process for each other drive electrode column and sense electrode row to generate additional sets of capacitance values for each row of sense electrodes when sequentially capacitively coupled to each drive electrode column. The touch sensor controller 170 can then: assemble these capacitance values into a capacitive touch image; implement mutual-capacitance sensing techniques to interpret locations of inputs on the touch sensor surface 110 based on capacitance values represented in this capacitive touch image; and label this input as non-stylus input on the touch sensor surface 110.

During a baseline segment of this scan cycle (such as before or after the touch segment of the scan cycle), the touch sensor controller 170 can: switch the drive electrode columns to a sensing configuration; disable the excitation inductors 130; record a capacitance value from each drive electrode column, such as simultaneously; record a capacitance value from each sense electrode row, such as simultaneously and concurrent with the drive electrode columns; and assemble these capacitance values into a baseline capacitance image.

During a stylus segment of this scan cycle (such as before, between, or after the touch and baseline segments of the scan cycle), the touch sensor controller 170 can: switch the drive electrode columns to a sensing configuration; and drive the excitation inductors 130 at the drive frequency, which produces an oscillating magnetic field (or a series of "coil pulses") at the excitation inductors 130. For each coil pulse at the excitation inductors 130, the touch sensor controller 170 can: record a capacitance value from each drive electrode column, such as simultaneously; record a capacitance value from each sense electrode row, such as simultaneously and concurrent with the drive electrode columns; and assemble these capacitance values into a pulse capacitance image (or "snapshot"). For example, for each coil pulse, the touch sensor controller 170 can record a capacitance value from each drive electrode column and from each sense electrode row at a time temporally offset from actuation of the excitation inductors 130 by a known phase offset of the stylus 140 such that these capacitance values represent peak capacitive coupling between the stylus 140 and adjacent electrodes in the touch sensor 120 following this coil pulse. The touch sensor controller 170 can then: calculate a combination (e.g., an average) of these pulse capacitance images and store this combination as a capacitive stylus image for this scan cycle; and fuse the baseline and capacitive stylus images to generate a denoised capacitive stylus image (e.g., by subtracting the baseline capacitance image from the capacitive stylus image).

The touch sensor controller 170 can then characterize variance of capacitance values across the denoised capacitive stylus image (or otherwise scan the denoised capacitive stylus image for features indicative of a conductive object coupled to an oscillating voltage source, such as at the stylus 140, near the touch sensor surface 110). If this variance is low (or if the touch sensor controller 170 otherwise detects absence of such features in the denoised capacitive stylus image), the touch sensor controller 170 can predict absence of a stylus 140 near the touch sensor surface 110.

Conversely, if this variance is high (or if the touch sensor controller 170 otherwise detects such features in the denoised capacitive stylus image), the touch sensor controller 170 can: predict presence of a stylus 140 near the touch sensor surface 110; and implement self-capacitance sensing techniques to interpret a (x,y) location of a stylus 140 over touch sensor surface 110 based on a capacitance value stored in this denoised capacitive stylus image (e.g., by triangulating (x,y) location of the stylus 140 based on (x,y) locations of amplitudes represented in this denoised capacitive stylus image).

For example, the touch sensor controller 170 can be configured to, during a baseline segment preceding the stylus segment of the scan cycle: set the first array of drive electrodes 124 to a sensing configuration; disable the excitation inductor 130; detect a third set of capacitance values from the first array of drive electrodes 124; and detect a fourth set of capacitance values from the second array of sense electrodes 126. The touch sensor controller 170 can also be configured to: generate a baseline capacitance image based on the third set of capacitance values and the fourth set of capacitance values; generate a first capacitance stylus image based on the first set of capacitance values and the second set of capacitance values; and generate a denoised capacitive stylus image by subtracting the baseline capacitance image from the first capacitance stylus image. Once these images have been generated, the touch sensor controller 170 can then: detect a first variance of capacitance values in the denoised capacitive stylus image; and, in response to the first variance exceeding a target variance threshold, detect the first stylus location of the first input.

6.5 Selective Stylus Segments

In one implementation, the system 100 always executes each of a touch segment and a stylus segment during one scan cycle.

Alternatively, the system 100 can: drive the excitation inductor 130 with an alternating voltage signal, detect a first set of self-capacitance values across the first array of drive electrodes 124, detect a second set of-self-capacitance values across the second array of sense electrodes 126, and detect an absence of a stylus input based on the first set of self-capacitance values and the second set of self-capacitance values. In response to detecting an absence of the stylus input, the system 100 can: intermittently execute a stylus segment scan cycle to detect presence of a stylus input, such as, once per two-second interval, in order to reduce power consumption by avoiding excitation of the excitation inductor 130 and sensing of both the first array of drive electrodes 124 and second array of sense electrodes 126 during each scan cycle.

In response to detecting a stylus input during a touch segment scan cycle, the system 100 can initiate a combined touch segment and stylus segment scan cycle and execute methods and techniques described above to detect stylus inputs and non-stylus inputs on the touch sensor surface 110. The system 100 can continue to execute combined touch segment and stylus segment scan cycles for a threshold duration (e.g. on minute) after the stylus input is detected on the touch sensor surface 110. Once the threshold duration is exceeded, the system 100 can return to executing touch segment scan cycles with intermittent stylus segment scan cycles.

6.6 Data Over Capacitive Coupling

In one variation, the touch sensor 120 and the touch sensor controller 170 cooperate to record data encoded in voltage oscillations of the conductive stylus tip 144 during the stylus segment of a scan cycle. In particular, for the smart stylus 140 described above, the stylus controller 148 can encode additional data into an alternating voltage applied to the conductive stylus tip 144 when the stylus circuit 150 is energized by the excitation inductors 130 during (and/or before) the stylus segment of the scan cycle.

In this variation, the touch sensor controller 170 can execute touch and baseline segments of the scan cycle as described above. However, during the stylus segment of the scan cycle, the touch sensor controller 170 can: transmit a sequence of coil pulses (e.g., eight coil pulses) to the excitation inductors 130 at the drive frequency. For each coil pulse at the excitation inductors 130, the touch sensor controller 170 can: record a capacitance value from each drive electrode column and record a capacitance value from each sense electrode row, such as temporally offset from actuation of the excitation inductors 130 by a known phase offset of the stylus 140 as described above; and assemble these capacitance values into one pulse capacitance image for this coil pulse. The touch sensor controller 170 can then: calculate a combination (e.g., an average) of these pulse capacitance images and store as an average capacitive stylus image for this scan cycle; fuse the baseline and the average capacitive stylus images to generate a denoised average capacitive stylus image (e.g., by subtracting the baseline capacitance image from the average capacitive stylus image); repeat methods and techniques described above to characterize capacitance value variance across the denoised average capacitive stylus image; and then predict and handle absence of a stylus 140 near the touch sensor surface 110 if this variance is low.

However, if this variance exceeds a threshold or if the touch sensor controller 170 detects features—indicative of a conductive object coupled to an oscillating voltage source near the touch sensor surface 110—in this denoised average capacitive stylus image, the touch sensor controller 170 can implement self-capacitance touch sensing techniques to detect an (x,y) location of the conductive stylus tip 144 over the touch sensor surface 110 based on the denoised average capacitive stylus image. Then, for a first capacitive stylus image—in the sequence of capacitive stylus images captured by the touch sensor controller 170 during the stylus segment of the scan cycle—the touch sensor controller 170 can: fuse the first capacitive stylus image with the baseline capacitance image to calculate a first denoised capacitive stylus image; isolate a region of the first denoised stylus image around the detected (x,y) location of the stylus 140 during this scan cycle; interpret a voltage "HIGH" (or binary "1" value) at the conductive stylus tip 144—responsive to the first coil pulse at the excitation inductors 130 during the stylus segment of the scan cycle—if capacitance values within this region of the first denoised stylus image exceed a threshold capacitance value (e.g., an average of all capacitance values across the region of the first denoised stylus image); interpret a voltage "LOW" (or binary "o" value) at the conductive stylus tip 144—responsive to the first coil pulse at the excitation inductors 130 during the stylus segment of the scan cycle—if capacitance values within this region of the first denoised stylus image fall below the threshold capacitance value; and store this first binary value for the first denoised stylus image. The touch sensor controller 170 can repeat this process for each other capacitive stylus image captured by the touch sensor controller 170 during this stylus segment of the scan cycle.

In one implementation, the touch sensor controller 170 assembles these binary values interpreted from the denoised stylus images for this scan cycle into one data packet—of length equal to the number of coil pulses output by the excitation inductors 130 during the stylus segment of the scan cycle—for the scan cycle. The touch sensor controller 170 then interprets this data packet, such as by reading an 8-bit stylus identifier or an 8-bit force value—for an 8-coil-pulse stylus segment of the scan cycle—from the data packet and implements a function or labels the stylus input according this data packet.

In another implementation, the touch sensor controller 170 repeats this process over multiple scan cycles and assembles sequences of binary values interpreted from stylus images during consecutive scan cycles into a larger, multi-scan-cycle data stream output by the stylus 140. The touch sensor controller 170 then implements similar methods and techniques to interpret this data stream, such as by reading identifying, force, and/or other values longer than 8 bits from this data stream.

6.7 Low-Frequency Excitation+High Frequency Sensing

In the foregoing implementations, the touch sensor controller 170 can sample the drive and sense electrodes in the touch sensor 120 at a frequency approximating the drive frequency of the excitation inductors 130 during the scan segment of a scan cycle (e.g., 200 Hz).

Alternatively, in the variations described above in which the stylus 140 alternates the conductive stylus tip 144 at a fixed or variable tip frequency that differs from the drive frequency of the excitation inductors 130—such as based on a function selected at the stylus 140 or a force applied to the conductive stylus tip 144—the touch sensor controller 170 can: sample the drive and sense electrodes at a scan rate greater than the drive frequency of the excitation inductors 130 (e.g., 400 Hz versus 50 Hz, respectively) during a stylus segment of a scan cycle; implement methods and techniques described above to detect an (x,y) location of the stylus 140 on or near the touch sensor surface 110; detect a peak capacitance value at this (x,y) location over multiple capacitive stylus images captured during this stylus segment of the scan cycle; interpolate an oscillating signal output by the conductive stylus tip 144 during this stylus segment of the scan cycle based on the peak capacitance value; and derive a current stylus frequency of these oscillating signal.

The touch sensor controller 170 can then identify the stylus 140, interpret a force applied to the conductive stylus tip 144, or interpret a function selected at the stylus 140, etc. based on this stylus frequency and a known configuration of the stylus 140.

6.8 Stylus Pitch/Roll Orientation

In one variation, the stylus 140 includes two stylus circuits (e.g., two LC circuits) characterized by different resonant frequencies, including: a first stylus circuit 150 including a first stylus inductor 152 coupled to a first capacitor 154 and a first conductive stylus tip segment 144A and characterized by a first resonant frequency; and a second stylus circuit 160 including a second stylus inductor 162 coupled to a second capacitor 164 and a segment conductive stylus tip segment 144B—isolated from the first conductive stylus tip segment 144A—and characterized by a second resonant frequency different from the first resonant frequency.

In this variation, the second stylus inductor 162 can define a winding axis non-parallel (e.g., perpendicular to the winding axis of the first stylus inductor 152) such that the first and second stylus inductors exhibit different magnitudes of inductive coupling to the excitation inductors 130 based on the pitch and yaw positions of the stylus 140 relative to the touch sensor 120.

In this variation, when the stylus 140 is brought near the touch sensor surface 110, the excitation inductors 130 couple to both LC circuits and produce alternating voltages—at different frequencies—at the first and segment conductive stylus tip segment 144Bs. Inductive coupling between the excitation inductors 130 and the first stylus inductor 152 is high and inductive coupling between the excitation inductors 130 and the second stylus inductor 162 is low, thereby yielding high voltages from the first conductive stylus tip segment 144A at the first resonant frequency and low voltages from the second conductive stylus tip segment 144B at the second resonant frequency. As the stylus 140 tilts off of this normal axis, inductive coupling between the excitation inductors 130 and the first stylus inductor 152 deceases and inductive coupling between the excitation inductors 130 and the second stylus inductor 162 increases, thereby decreasing voltages from the first conductive stylus tip segment 144A at the first resonant frequency and increasing voltages from the second conductive stylus tip segment 144B at the second resonant frequency.

The touch sensor controller 170 can therefore: implement methods and techniques described above to capture capacitance values at the stylus location on the touch sensor surface 110; implement signal processing techniques (e.g., Fourier analysis) to disambiguate relative amplitudes of capacitive coupling between the drive and sense electrodes and the first and second stylus tip segments; and interpret a pitch (or roll) angle of the stylus relative to the touch sensor surface 110 based on these relative magnitudes of capacitive coupling—such as the ratio of the peak capacitance value occurring at the first resonant frequency and to the peak capacitance value occurring at the second resonant frequency during this scan cycle.

For example, the stylus 140 can include a second stylus circuit 160 characterized by a second resonant frequency different from the first resonant frequency and including: a second stylus inductor 162 positioned non-parallel to the first stylus inductor 152; and a second capacitor 164 arranged in parallel with the second stylus inductor 162. Additionally, the conductive stylus tip 144 includes: a first tip segment coupled to the first stylus circuit 150; and a second tip segment isolated from the first conductive stylus tip segment 144A, and coupled to the second stylus circuit 160. The touch sensor controller 170 can then, during the stylus segment of the scan cycle, drive the first excitation inductor 130 with the alternating voltage signal to induce: the first voltage across the first tip segment; and a second voltage across the second tip segment different from the first voltage. The touch sensor controller 170 can also be configured to: detect a first peak capacitance value in the first set of self-capacitance values and the second set of self-capacitance values based on the first resonant frequency; detect a second peak capacitance value in the first set of self-capacitance values and the second set of self-capacitance values based on the second resonant frequency; and calculate a pitch ratio based on the first peak capacitance value and the second peak capacitance value. The touch sensor controller 170 can then interpret a pitch for the conductive stylus tip 144 relative to the touch sensor surface 110 based on the tip ratio.

In another variation, rather than first and second stylus tip segments, the first stylus inductor 152 can be coupled to the conductive stylus tip 144, and the second stylus inductor 162 can be coupled to a second conductive element arranged on the stylus and offset behind the conductive stylus tip 144. The touch sensor controller 170 can then implement similar methods and techniques and detect the pitch and/or roll) position of the stylus 140 relative to the touch sensor surface 110 as a function of the ratio of peak capacitance value magnitudes at the first and second resonant frequencies, which may: increase when the stylus 140 is normal to the touch sensor surface 110, as this positioning locates the second conductive element at a relatively long distance from the touch sensor surface 110 and induces minimal changes in capacitance value at the second resonant frequency at the drive and sense electrodes; and decrease when the stylus 140 is pitched or rolled closer to the touch sensor surface 110, as this positioning locates the second conductive element at a relatively shorter distance from the touch sensor surface 110 and induces larger changes in capacitance value at the second resonant frequency at the drive and sense electrodes.

6.9 Stylus Yaw Orientation

In a similar variation, the stylus 140 includes a pair of stylus inductors arranged in like orientations, forming two discrete LC circuits of different resonant frequencies, and coupled to first and second segments of the conductive stylus tip 144, respectively.

In this variation, the stylus inductors drive their respective segments of the conductive stylus tip 144 to similar voltages regardless of pitch and roll angle of the stylus 140. However, in this variation, the touch sensor controller 170 can: detect alternating capacitance values at the first resonant frequency and at a first (x,y) location in a sequence of capacitive stylus images; detect alternating capacitance values at the second resonant frequency at a second (x,y) location—adjacent and offset from the first (x,y) location—in this sequence of capacitive stylus images; calculate a vector passing through these first and second (x,y) locations; and derive an orientation (i.e., a yaw angle) of the stylus 140 on the touch sensor surface 110 based on this vector.

For example, the stylus 140 can include a second stylus circuit 160 characterized by a second resonant frequency different from the first resonant frequency and including: a second stylus inductor 162 positioned non-parallel to the first stylus inductor 152; and a second capacitor 164 arranged in parallel with the second stylus inductor 162. Additionally, the conductive stylus tip 144 can include: a first tip segment coupled to the first stylus circuit 150; and a second tip segment isolated from the first conductive stylus tip segment 144A, and coupled to the second stylus circuit 160. The touch sensor controller 170 can then, during the stylus segment of the scan cycle, drive the excitation inductor 130 with the alternating voltage signal to induce: the first voltage across the first tip segment; and a second voltage across the second tip segment different from the first voltage. The touch sensor controller 170 can then: detect a first set of oscillating capacitance values, at the first resonant frequency, at the first stylus location in the first set of self-capacitance values and the second set of self-capacitance values; and detect a second set of oscillating capacitance values, at the second resonant frequency, at a second stylus location in the first set of self-capacitance values and the second set of self-capacitance values. In this example, the touch sensor controller 170 can then: calculate a first vector passing through the first stylus location and the second stylus location; and interpret a yaw angle of the stylus based on the first vector.

6.10 Continuous Excitation Inductor 130 Actuation

In another variation, the touch sensor controller 170 applies an alternating current to the excitation inductors 130 continuous throughout a scan cycle, such as rather than only during stylus segments of scan cycles. In this variation, the touch sensor controller 170 captures capacitive stylus images, as described above, synchronized to (i.e., around times of) peak voltages at the conductive stylus tip 144, which are synchronized or phase offset—by a fixed, known time duration—from peak voltages applied to the excitation inductors 130. The touch sensor controller 170 similarly captures capacitance touch images, as described above, synchronized to (i.e., around times of) null voltages at the conductive stylus tip 144, which are synchronized or phase offset—by the fixed, known time duration—from null voltages applied to the excitation inductors 130.

Therefore, in this variation, the touch sensor controller 170 can: continuously energize the stylus 140, power the stylus controller 148, and enable the conductive stylus tip 144 to output a high peak voltage that is detectable by the touch sensor 120 and touch sensor controller 170 via self-capacitance techniques even at relatively long distances (e.g., multiple centimeters) between the conductive stylus tip 144 and the touch sensor surface 110; while also detecting concurrent finger touches on the touch sensor surface 110 via mutual-capacitance techniques.

6.11 Separate Stylus Location+Data Cycle

In yet another implementation, the stylus 140 includes a wireless communication module, such as coupled to the stylus controller 148, coupled to a force sensor 149 in the stylus 140, coupled to a function switch on the stylus 140, or encoded with an unique identifier of the stylus 140.

In this variation, the stylus circuit 150 can harvest energy from the excitation inductor 130, as described above, both: to induce a voltage across the conductive stylus tip 144, which is detected by the touch sensor controller 170 to track the (x,y) position of the conductive stylus tip 144 on the touch sensor surface 110; and to power the wireless communication module, which transmits values output by the stylus controller 148, a value read from the force sensor 149, a state of the function switch, and/or the unique identifier of the stylus 140 to the touch sensor 120.

In this variation, the touch sensor controller 170 can therefore: implement methods and techniques described above to detect and track location of the conductive stylus tip 144 on the touch sensor surface 110 based on changes in capacitance values at the drive and sense electrodes resulting from a voltage across the conductive stylus tip 144; and power the wireless communication module in the stylus 140—via the excitation inductors 130—to broadcast additional operational, functional, and/or identifying data back to the touch sensor controller 170.

7. Output

At the conclusion of each scan cycle, the touch sensor controller 170 can aggregate: the detected (x,y) location of the stylus 140; the pitch, yaw, and/or roll orientations of the stylus 140; the stylus identifier; a stylus function; and/or a stylus tip force thus derived from capacitance value data captured through the capacitance values read from the drive and sense electrodes and/or received from the wireless communication module in the stylus 140. The touch sensor controller 170 can then: compile these data into a stylus input packet for the current scan cycle: and return this stylus input packet for the current scan cycle to a connected or integrated device (e.g., a laptop computer, a tablet, a smartphone), which can then reflect this stylus input packet within a graphical user interface.

The touch sensor controller 170 can concurrently: generate a touch input packet representing locations of touch inputs detected on the touch sensor surface 110 from mutual-capacitance data captured during the touch segment of the scan cycle; and return this touch input packet for the current scan cycle to the connected or integrated device, which can then reflect this touch input packet within the graphical user interface.

8. Multi-Stylus Operation

In the foregoing variations, the touch sensor controller 170 can implement similar methods and techniques to detect, track, and distinguish multiple styluses in contact within or near the touch sensor surface 110 during a sequence of scan cycles, such as by distinguishing these stylus by different resonant frequencies of their stylus circuit 150s, which produce oscillations in voltage of their stylus tips at different frequencies and thus oscillation in capacitance value changes in the drive and sense electrodes at these different frequencies.

9. Integrated Coils

In one variation, the system 100 includes the excitation inductor 130 integrated into the substrate 122. The excitation inductor 130 can be formed by a set of planar coil traces etched or fabricated on each of multiple layers within the substrate 122 and interconnected through these layers to form one continuous inductor with multiple turns, one or more cores, and/or one or more windings arranged over the set of magnetic elements.

For example, the substrate 122 can include: a top layer 122A including the first array of drive electrodes 124 and the second array of sense electrodes 126; a first layer 122B arranged below the top layer 122A; and a second layer 122C arranged below the first layer 122B opposite the top layer 122A. Additionally, the first excitation inductor 130 is integrated into the substrate 122 and includes a first spiral trace 130A: arranged on the first layer 122B of the substrate 122; coiled in a first direction; and defining a first end and a second end. Furthermore, the first excitation inductor 130 includes a second spiral trace 130B: arranged on the second layer 122C of the substrate 122; coiled in a second direction opposite the first direction; and defining a third end and a fourth end, the third end electrically coupled to the second end of the first spiral trace 130A. More specifically, the first spiral trace 130A defines a first planar coil spiraling inwardly in a clockwise direction within the first layer 122B; and the second spiral trace 130B defines a second planar coil spiraling outwardly in a counter-clockwise direction within the second layer 122C. The second spiral trace 130B cooperates with the first spiral trace 130A to pass current in a common direction about a center of the first excitation inductor 130.

Thus, in this example, the excitation inductor 130 can include multiple spiral traces spanning multiple layers of the substrate 122 and connected to form a continuous inductive coil with two terminals falling in close proximity (e.g. within two millimeters) on a bottom layer of the substrate 122.

Further, in this example, the touch sensor controller 170 can supply an oscillating voltage to the excitation inductor 130 (e.g. via a drive circuit coupled to and triggered by the touch sensor controller 170) which induces an alternating magnetic field through the multi-layer inductor, which in turn couples the stylus inductor 152 to then induce a voltage across the conductive stylus tip 144.

10. Force Switch

In one implementation, the stylus circuit 150 is selectively coupled to the inductive stylus tip via a force switch 180. In this implementation, the force switch 180 can include: a support member 182 embedded within the conductive stylus tip 144; a spring 184 supported by the support member 182;

and a conductive ring 186 above the tip selectively coupled to the conductive stylus tip 144.

In this implementation, the stylus circuit 150 is coupled to the conductive ring 186 such that, when the stylus inductor 152 is coupled to the first excitation inductor 130, the first voltage is induced across the conductive ring 186. As a result, the first voltage is induced across the conductive stylus tip 144 in response to a force applied to the stylus 140 that couples with the conductive stylus tip 144 to the conductive ring 186. In this implementation, when the spring 184 is in a resting position (e.g., no force is applied to the stylus 140), a gap (e.g., 0.01 meters) separates the conductive stylus tip 144 from the conductive stylus tip 144. As a result, there is no voltage induced across the conductive stylus tip 144. Further, in this implementation, when the spring 184 is in a compressed position (e.g., force applied to the stylus 140), the conductive ring 186 is urged towards the conductive stylus tip 144. As a result, the conductive stylus tip 144 couples with the conductive ring 186 and the first voltage is induced across the conductive stylus tip 144.

In this implementation, the touch sensor controller 170 can detect the stylus input over the touch sensor surface 110 only when a user applies a force over the touch sensor surface 110 with the stylus 140. This implementation can prevent the touch sensor controller 170 from detecting stylus inputs on the touch sensor surface 110 when the stylus 140 is hovering above the touch sensor surface 110.

For example, the stylus 140 can include a force switch 180 selectively coupling the stylus inductor 152 to the conductive stylus tip 144. The force switch 180 includes: a support member 182 arranged inside the conductive stylus tip 144; a spring 184 arranged on the support member 182; and a conductive ring 186 arranged above the conductive stylus tip 144 and configured to couple to the conductive stylus tip 144 in response to an applied force magnitude on the touch sensor surface 110. Furthermore, the touch sensor controller 170 is configured to, during a second touch segment for a second scan cycle at a first time, drive the excitation inductor 130 with the alternating voltage signal. Additionally, the touch sensor controller 170 is configured to, at a second time temporally offset for the first time: detect a third set of self-capacitance values across the first array of drive electrodes 124; and detect a fourth set of self-capacitance values across the second array of sense electrodes 126. The touch sensor controller 170 can then: detect absence of a peak capacitance value in the third set of self-capacitance values and the fourth set of self-capacitance values; interpret absence of a second touch input on the touch sensor surface 110, representing the stylus 140 hovering above the touch sensor surface 110; and, in response to absence of the second touch input, initiate a second touch cycle for the second scan cycle.

11. Display

In one implementation, the system 100 includes a substrate 122, an array of drive and sense electrode pairs arranged over the substrate 122, and a display arranged over the substrate 122 and the drive and sense electrode pairs.

In another implementation, the system 100 includes a touchscreen arranged over the substrate 122 including: a display, an array of drive and sense electrode pairs arranged over the display, and a cover layer—defining the touch sensor surface 110—arranged over the drive electrode and sense electrode pairs and the display.

In another implementation, the system 100 includes an excitation inductor 130 arranged under the display. In one variation of this implementation, the excitation inductor 130 includes a multilayer inductor formed by spiral traces fabricated across multiple layers of a multi-layer PCB arranged under the display. In another variation of this implementation, the excitation inductor 130 includes a multilayer inductor formed by spiral traces fabricated across multiple layers of the substrate 122 of the display or touchscreen.

12. Mobile Device Charging

In one implementation, the system 100 can charge a mobile device (e.g. a smartphone) place on the system 100 by coupling to the excitation inductor 130 coupled to the substrate 122.

For example, the system 100 can: intermittently broadcast query for a wireless-charging-enabled device, and initiate an active inductive charging period in response to receiving a prompt or command from a nearby mobile device. Otherwise, the system 100 can continuously execute finger segment and stylus segment scan cycles as described above.

As a person skilled in the art will recognize from the previous detailed description and from the figures and claims, modifications and changes can be made to the embodiments of the invention without departing from the scope of this invention as defined in the following claims.

I claim:

1. A system for tracking stylus inputs on a touch sensor surface comprising:
    a touch sensor surface;
    a touch sensor arranged under the touch sensor surface and comprising:
        a substrate;
        a first array of drive electrodes arranged on the substrate; and
        a second array of sense electrodes arranged on the substrate and paired with the first array of drive electrodes;
    a first excitation inductor arranged under the touch sensor surface;
    a stylus comprising:
        a body;
        a conductive stylus tip arranged on a distal end of the body; and
        a first stylus inductor arranged in the body and configured to inductively couple to the first excitation inductor to induce a first voltage at the conductive stylus tip; and
    a touch sensor controller configured to:
        during a first touch segment of a first scan cycle:
            drive the first array of drive electrodes;
            detect a set of mutual-capacitance values across the second array of sense electrodes; and
            detect a touch location of a non-stylus input on the touch sensor surface based on the set of mutual-capacitance values; and
        during a first stylus segment of the first scan cycle:
            drive the first excitation inductor with an alternating voltage signal;
            detect a first set of self-capacitance values across the first array of drive electrodes;
            detect a second set of self-capacitance values across the second array of sense electrodes; and
            detect a first stylus location of a stylus input for the conductive stylus tip on the touch sensor surface based on the first set of self-capacitance values and the second set of self-capacitance values.

2. The system of claim 1:
    wherein the stylus comprises a first stylus circuit characterized by a first resonant frequency and comprising:
        the first stylus inductor; and a first capacitor arranged in parallel with the first stylus inductor; and wherein the touch sensor controller is configured to:
  detect a first cluster of oscillating capacitance values in the first set of self-capacitance values and the second set of self-capacitance values; and
  detect the first stylus location of the stylus input over the touch sensor surface based on the first cluster of oscillating capacitance values.

3. The system of claim 2, wherein the touch sensor controller is configured to:
  during the first stylus segment of the first scan cycle, drive the first excitation inductor at a first drive frequency matched to the first resonant frequency to generate a first magnetic pulse that inductively couples to the first stylus inductor; and
  detect the first cluster of oscillating capacitance values, in the first set of self-capacitance values and the second set of capacitance values, oscillating at the first resonant frequency.

4. The system of claim 2:
wherein the stylus comprises a second stylus circuit characterized by a second resonant frequency different from the first resonant frequency and comprising:
  a second stylus inductor positioned non-parallel to the first stylus inductor; and
  a second capacitor arranged in parallel with the second stylus inductor;
wherein the conductive stylus tip comprises:
  a first tip segment coupled to the first stylus circuit; and
  a second tip segment isolated from the first conductive stylus tip segment, and coupled to the second stylus circuit; and
wherein the touch sensor controller is configured to:
  during the first stylus segment of the first scan cycle, drive the first excitation inductor with the alternating voltage signal to induce:
    the first voltage across the first tip segment; and
    a second voltage across the second tip segment different from the first voltage;
  detect a first peak capacitance value in the first set of self-capacitance values and the second set of self-capacitance values based on the first resonant frequency;
  detect a second peak capacitance value in the first set of self-capacitance values and the second set of self-capacitance values based on the second resonant frequency;
  calculate a pitch ratio based on the first peak capacitance value and the second peak capacitance value; and
  interpret a pitch for the conductive stylus tip relative to the touch sensor surface based on the tip ratio.

5. The system of claim 3:
wherein the stylus comprises a second stylus circuit characterized by a second resonant frequency different from the first resonant frequency and comprising:
  a second stylus inductor positioned non-parallel to the first stylus inductor; and
  a second capacitor arranged in parallel with the second stylus inductor;
wherein the conductive stylus tip comprises:
  a first tip segment coupled to the first stylus circuit; and
  a second tip segment isolated from the first conductive stylus tip segment, and coupled to the second stylus circuit; and wherein the touch sensor controller is configured to,
  during the first stylus segment of the first scan cycle, drive the first excitation inductor with the alternating voltage signal to induce:
    the first voltage across the first tip segment; and
    a second voltage across the second tip segment different from the first voltage;
  detect a first set of oscillating capacitance values, at the first resonant frequency, at the first stylus location in the first set of self-capacitance values and the second set of capacitance values;
  detect a second set of oscillating capacitance values, at the second resonant frequency, at a second stylus location in first set of self-capacitance values and the second set of capacitance values;
  calculate a first vector passing through the first stylus location and the second stylus location; and
  interpret a yaw angle of the stylus based on the first vector.

6. The system of claim 1:
wherein the stylus further comprises:
  an energy harvesting circuit coupled to the first stylus circuit and configured to store energy produced when the first stylus inductor couples to the first excitation inductor; and
  a stylus controller coupled to the energy harvesting circuit and configured to drive the conductive stylus tip at a first tip frequency to induce a second voltage different from the first voltage;
wherein the touch sensor controller is configured to:
  access a first tip function based on the first tip frequency from a set of tip functions; and
  during a second stylus segment proceeding the first stylus segment in the scan cycle:
    detect a third set of self-capacitance values across the first array of drive electrodes;
    detect a fourth set of self-capacitance values across the second array of sense electrodes;
    detect a cluster of oscillating capacitance values, at the first tip frequency, in the third set of self-capacitance values and the third set of self-capacitance values; and
    assign the first tip function to the stylus input.

7. The system of claim 1, wherein the touch sensor controller is configured to:
  during a baseline segment preceding the first stylus segment of the first scan cycle:
    set the first array of drive electrodes to a sensing configuration;
    disable the first excitation inductor;
    detect a third set of capacitance values from the first array of drive electrodes; and
    detect a fourth set of capacitance values from the second array of sense electrodes;
  generate a baseline capacitance image based on the third set of capacitance values and the fourth set of capacitance values;
  generate a first capacitance stylus image based on the first set of capacitance values and the second set of capacitance values;
  generate a denoised capacitive stylus image by subtracting the baseline capacitance image from the first capacitance stylus image;
  detect a first variance of capacitance values in the denoised capacitive stylus image; and
  in response to the first variance exceeding a target variance threshold, detect the first stylus location of the first input.

8. The system of claim 1:
wherein the first stylus inductor arranged in the body is configured to inductively couple to the first excitation inductor to induce the first voltage at the conductive stylus tip synchronized with the alternating voltage signal at a first phase offset; and
wherein the touch sensor controller is configured to, during the first stylus segment of the first scan cycle:
at a first time, drive the first excitation inductor with the alternating voltage signal to inductively couple the first stylus inductor; and
at a second time temporally offset from the first time matching the first phase offset:
detect the first set of self-capacitance values across the first array of drive electrodes;
detect the second set of self-capacitance values across the second array of sense electrodes;
detect a first peak of capacitance values in the first set of self-capacitance values and the second set of self-capacitance values; and
detect the first stylus location of the stylus input over the touch sensor surface based on the first peak of capacitance values.

9. The system of claim 1:
wherein the stylus comprises:
an energy harvesting circuit coupled to the first stylus circuit and configured to store energy produced when the first stylus inductor couples to the first excitation inductor;
a force sensor coupled to the conductive stylus tip; and
a stylus controller coupled to the energy harvesting circuit and the force sensor, configured to:
detect a first force magnitude applied to the touch sensor surface from the force sensor;
transform the first force magnitude into a first tip frequency; and
drive the conductive stylus tip at the first tip frequency to induce a second voltage different from the first voltage;
wherein the touch sensor controller is configured to, during a second stylus segment of a second scan cycle:
detect a third set of self-capacitance values form the first array of drive electrodes;
detect a fourth set of self-capacitance values from the second array of sense electrodes;
detect a cluster of oscillating capacitance values, at the first tip frequency, in the third set of self-capacitance values and the fourth set of self-capacitance values; and
interpret the first force magnitude for the stylus input based on the cluster of oscillating capacitance values.

10. The system of claim 1:
wherein the stylus comprises a first stylus circuit characterized by a variable resonant frequency, comprising:
the first stylus inductor; and
a first set of capacitors each selectively coupled to the first stylus inductor; and
wherein the touch sensor controller is configured to:
during the first stylus segment of the first scan cycle:
at a first time, drive the first excitation inductor at a first drive frequency matching a first resonant frequency in the first stylus circuit for a first capacitor from the first set of capacitors; and
at a second time, temporally offset from the first time:
detect the first set of self-capacitance values from the first array of drive electrodes; and
detect the second set of self-capacitance values from the second array of sense electrodes;
access a first stylus type based on the first resonant frequency;
detect a first cluster of oscillating capacitance values, at the first resonant frequency, in the first set of self-capacitance values and the second set of self-capacitance values; and
assign the first stylus type to the stylus input.

11. The system of claim 10, wherein the touch sensor controller is configured to:
during a second stylus segment of a second scan cycle:
at a third time, drive the first excitation inductor at a second drive frequency matching a second resonant frequency in the first stylus circuit for a second capacitor from the first set of capacitors; and
at a fourth time, temporally offset from the third time:
detect a third set of self-capacitance values from the first array of drive electrodes; and
detect a fourth set of self-capacitance values from the second array of drive electrodes;
access a second stylus type, different from the first stylus type, based on the second resonant frequency;
detect a second cluster of oscillating capacitance values, at the second resonant frequency, in the third set of self-capacitance values and the fourth set of self-capacitance values;
detect a second stylus input based on the second cluster of oscillating capacitance values; and
assign the second stylus type to the second stylus input.

12. The system of claim 1:
wherein the stylus comprises a force switch selectively coupling the stylus inductor to the conductive stylus tip comprising:
a support member arranged inside the conductive stylus tip;
a spring arranged on the support member; and
a conductive ring arranged above the conductive stylus tip and configured to couple to the conductive stylus tip in response to an applied force magnitude on the touch sensor surface; and
wherein the touch sensor controller is configured to:
during a second stylus segment for a second scan cycle:
at a first time, drive the first excitation inductor with the alternating voltage signal; and
at a second time temporally offset from the first time:
detect a third set of self-capacitance values across the first array of drive electrodes; and
detect a fourth set of self-capacitance values across the second array of sense electrodes;
detect absence of a peak capacitance value in the third set of self-capacitance values and the fourth set of self-capacitance values;
interpret absence of a second touch input on the touch sensor surface, representing the stylus hovering above the touch sensor surface; and
in response to absence of the second touch input, initiate a second touch cycle for the second scan cycle.

13. The system of claim 1:
wherein the substrate comprises:
a top layer comprising the first array of drive electrodes and the second array of sense electrodes;
a first layer arranged below the top layer; and a second layer arranged below the first layer opposite the top layer; and
wherein the first excitation inductor is integrated into the substrate and comprises:
a first spiral trace:
arranged on the first layer of the substrate;
coiled in a first direction; and
defining a first end and a second end; and
a second spiral trace:
arranged on the second layer of the substrate;
coiled in a second direction opposite the first direction; and
defining a third end and a fourth end, the third end electrically coupled to the second end of the first spiral trace.

14. The system of claim 13:
wherein the first spiral trace defines a first planar coil spiraling inwardly in a clockwise direction within the first layer; and
wherein the second spiral trace defines a second planar coil spiraling outwardly in a counter-clockwise direction within the second layer and cooperating with the first spiral trace to pass current in a common direction about a center of the first excitation inductor.

15. The system of claim 1:
wherein the first excitation inductor comprises a first coiled wire coupled to the substrate under a first region of the touch sensor surface;
further comprising a second excitation inductor comprising a second coiled wire coupled to the substrate under a second region of the touch sensor surface; and
wherein the touch sensor controller is configured to:
detect a first cluster of capacitance values in the first set of self-capacitance values and the second set of self-capacitance values; and
in response to the first cluster of capacitance values matching a target stylus capacitance characteristic, detect the first stylus location of the stylus on the first region of the touch sensor surface.

16. The system of claim 1:
wherein the first excitation inductor comprises a first coiled wire coupled to the substrate under a first region of the touch sensor surface;
further comprising a second excitation inductor comprising a second coiled wire coupled to the substrate under a second region of the touch sensor surface; and
wherein the touch sensor controller is configured to:
during a second touch segment of the first scan cycle:
drive the second excitation inductor with the alternating voltage signal;
detect a third set of self-capacitance values from the first array of drive electrodes; and
detect a fourth set of self-capacitance values from the second array of sense electrodes;
detect a second cluster of capacitance values in the third set of self-capacitance values and the fourth set of self-capacitance values; and
in response to the second cluster of capacitance values matching a target non-stylus capacitance characteristic, detect the touch location of the non-stylus input on the second region of the touch sensor surface.

17. A system for tracking stylus inputs on a touch sensor surface comprising:
a touch sensor surface;
a touch sensor arranged under the touch sensor surface and comprising:
a substrate; and
a first set of drive and sense electrode pairs arranged on the substrate;
a first excitation inductor arranged under the touch sensor surface;
a stylus comprising:
a body;
a conductive stylus tip arranged on a distal end of the body; and
a first stylus inductor arranged in the body and configured to inductively couple to the first excitation inductor to induce a voltage at the conductive stylus tip; and
a touch sensor controller configured to:
during a first stylus segment of a first scan cycle:
drive the first excitation inductor with an alternating voltage signal; and
detect a first set of self-capacitance values across the first set of drive and sense electrode pairs; and
detect a stylus location of a stylus input for the conductive stylus tip on the touch sensor surface based on the first set of self-capacitance values.

18. The system of claim 17:
wherein the stylus comprises a first stylus circuit characterized by a first resonant frequency and comprising:
the first stylus inductor; and
a first capacitor arranged in parallel between the first stylus inductor; and
wherein the touch sensor controller is configured to
during the first stylus segment of the first scan cycle, drive the first excitation inductor at a first drive frequency matching the first resonant frequency to inductively couple the first stylus inductor;
detect a first cluster of oscillating capacitance values, at the first resonant frequency, in the first set of self-capacitance values; and
detect the stylus location of the stylus input over the touch sensor surface based on the first cluster of oscillating capacitance values.

19. The system of claim 17:
wherein the first stylus inductor arranged in the body is configured to inductively couple to the first excitation inductor to induce the first voltage at the conductive stylus tip synchronized with the alternating voltage signal at a first phase offset; and
wherein the touch sensor controller is configured to:
during the first stylus segment of the first scan cycle:
at a first time, drive the first excitation inductor with the alternating voltage signal to inductively couple the first stylus inductor; and
at a second time temporally offset from the first time matching the first phase offset, detect the first set of self-capacitance values across the first set of drive and sense electrode pairs; and
detect a first peak capacitance value in the first set of self-capacitance values; and
detect the stylus location of the stylus input over the touch sensor surface based on the first peak capacitance value.

20. A system for tracking stylus inputs on a touch sensor surface comprising:
a touch sensor surface;
a touch sensor arranged under the touch sensor surface and comprising:
a substrate;
a first array of drive electrodes arranged on the substrate; and a second array of sense electrodes arranged on the substrate and paired with the first array of drive electrodes;

a first excitation inductor arranged under the touch sensor surface;

a stylus comprising:
  a body;
  a conductive stylus tip arranged on a distal end of the body; and
  a first stylus circuit arranged in the body, characterized by a first resonant frequency, and comprising:
    a first stylus inductor configured to inductively couple to the first excitation inductor to induce a voltage at the conductive stylus tip with a first phase offset; and
    a first capacitor arranged in parallel with the first stylus inductor; and a touch sensor controller configured to:
  during a first stylus segment of the first scan cycle:
    at a first time, drive the first excitation inductor at a first drive frequency matching the first resonant frequency from the first stylus circuit; and
    at a second time, temporally offset from the first time matching the first phase offset:
      detect a first set of self-capacitance values across the first array of drive electrodes; and
      detect a second set of self-capacitance values across the second array of sense electrodes; and
  detect a stylus location of a stylus input for the conductive stylus tip on the touch sensor surface based on the first set of self-capacitance values and the second set of self-capacitance values.

\* \* \* \* \*